(12) United States Patent
Kotera et al.

(10) Patent No.: US 12,462,281 B2
(45) Date of Patent: Nov. 4, 2025

(54) INFORMATION PROCESSING DEVICE AND METHOD OF CREATING FEE PLAN

(71) Applicant: TOYOTA JIDOSHA KABUSHIKI KAISHA, Toyota (JP)

(72) Inventors: Shinya Kotera, Nagoya (JP); Yu Hamada, Nagoya (JP); Shohei Manabe, Nagoya (JP); Kazuyuki Sakuma, Nagoya (JP); Yuri Sonehara, Nagoya (JP); Shunichi Suzuki, Nagoya (JP); Takuya Taniguchi, Nagoya (JP); Kenta Kawashima, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 18/115,903

(22) Filed: Mar. 1, 2023

(65) Prior Publication Data
US 2023/0281683 A1     Sep. 7, 2023

(30) Foreign Application Priority Data
Mar. 4, 2022    (JP) ................................. 2022-033784

(51) Int. Cl.
  *G06Q 30/00*  (2023.01)
  *G06Q 30/06*  (2023.01)
  *G06Q 50/40*  (2024.01)
(52) U.S. Cl.
  CPC ............ *G06Q 30/06* (2013.01); *G06Q 50/40* (2024.01)
(58) Field of Classification Search
  CPC .............................................. G06Q 30/06–08
  See application file for complete search history.

(56) References Cited

U.S. PATENT DOCUMENTS

| | | | |
|---|---|---|---|
| 2003/0046199 A1* | 3/2003 | Murase | .................. G06Q 40/00 705/35 |
| 2011/0050239 A1* | 3/2011 | Hoshino | ................ G06Q 30/06 324/435 |

(Continued)

FOREIGN PATENT DOCUMENTS

| | | |
|---|---|---|
| JP | 2003-67659 A | 3/2003 |
| JP | 2008-152496 A | 7/2008 |

(Continued)

OTHER PUBLICATIONS

Samayoa, Monica, "EV Rebate Program Running Again for Low-Income Buyers", Statesman Journal, Salem, Oregon, Feb. 17, 2020 A2 (Year: 2020).*

(Continued)

*Primary Examiner* — Ethan D Civan
(74) *Attorney, Agent, or Firm* — Oliff PLC

(57) ABSTRACT

An information processing device is an information processing device that outputs a fee plan indicating a fee required to use a vehicle or battery selected by a user, the information processing device including: an acquisition unit that acquires selection information specifying a selected object selected by the user; and a processing unit that outputs the fee plan, wherein when the selected object is eligible for a subsidy, the processing unit outputs an eligible plan as the fee plan, and in the eligible plan, the fee is set to a fixed amount of money in an initial predetermined period, and the fee is set to be lower than the fixed amount of money and to be decreased with passage of time after the predetermined period has passed.

10 Claims, 17 Drawing Sheets

(56) References Cited

U.S. PATENT DOCUMENTS

2019/0035013 A1  1/2019  Berardi
2019/0156409 A1  5/2019  Igata et al.

FOREIGN PATENT DOCUMENTS

JP    2010-250392 A   11/2010
JP    2019-095988 A    6/2019

OTHER PUBLICATIONS

Sep. 24, 2024 Office Action issued in Japanese Patent Application No. 2022-033784.
Koichi Kimura, Viewpoint: Social Responsibility of Food Companies 162—Value Creation and Sustainable Marketing Strategy from Customer's Viewpoint, Food and Science, vol. 60, No. 12, Nov. 20, 2018, pp. 73-79.
Dec. 10, 2024 Office Action issued in Japanese Patent Application No. 2022-033784.
Japan Business Assurance Co., Ltd., Practical Guidebook for International Financial Reporting Standards, IFRS, <Second Edition>, second edition, Japan, CHUOKEIZAI-SHA, Jul. 20, 2010, pp. 107 and 108, ISBN 978-4-502-23300-5.

\* cited by examiner

INFORMATION PROCESSING DEVICE AND METHOD OF CREATING FEE PLAN

This nonprovisional application is based on Japanese Patent Application No. 2022-033784 filed on Mar. 4, 2022 with the Japan Patent Office, the entire contents of which are hereby incorporated by reference.

BACKGROUND

Field

The present disclosure relates to an information processing device and a method of creating a fee plan.

Description of the Background Art

Conventionally, there has been proposed various types of methods of creating lease plans for vehicles. For example, in a method of creating a lease plan as described in Japanese Patent Laying-Open No. 2003-67659, an entire lease period is set to a predetermined period (5 years), a setting period (3 years) shorter than the predetermined period is set, and a residual value after the three years is estimated. Then, cost to be recovered in the three years is calculated in accordance with the present price of the vehicle, the residual value after the 3 years, and various cost so as to calculate a lease fee for the 3 years in accordance with the cost to be recovered and a payment method selected by the user. Further, a residual value after the 5 years is estimated, and cost to be recovered in the whole of the 5 years is calculated in accordance with the present price of the vehicle, the residual value after the 5 years, and various cost. An amount of money obtained by subtracting the cost to be recovered in the 3 years from the cost to be recovered in the 5 years is regard as cost to be recovered in 2 years from the third year to the fifth year so as to calculate a lease fee for the two years in accordance with the cost to be recovered in the 2 years and the payment method selected by the user.

SUMMARY

A residual value of a BEV is greatly affected by a residual value of a battery. The residual value of the battery is affected by a capacity retention, and the capacity retention is greatly decreased from its initial state, i.e., brand new state, and is then decreased at a smaller rate. Thus, the residual value of the battery tends to be greatly decreased from that at the beginning of use.

As a result, a fee at the beginning of use is high in a fee plan of a service for providing a vehicle that can be used by a user when the user pays a fee in accordance with a predetermined fee plan With such a fee plan, the user may hesitate to use a BEV.

On the other hand, in recent years, a subsidization system has been established to promote use of a clean energy vehicle (CEV) or the like.

However, in the conventional method of creating a fee plan, there has not been proposed a method of presenting a fee plan that takes a residual value of a BEV, a subsidy, and the like into consideration and that facilitates a user to use a BEV.

The present disclosure has been made in view of the above-described problem, and has an object to propose an information processing device and a method of creating a fee plan so as to provide a fee plan that takes a residual value of a BEV or the like, an subsidy, and the like into consideration and that facilitates a user to use a BEV.

An information processing device according to the present disclosure is an information processing device that outputs a fee plan indicating a fee required to use a vehicle or battery selected by a user, the information processing device including: an acquisition unit that acquires selection information specifying a selected object selected by the user; and a processing unit that outputs the fee plan, wherein when the selected object is eligible for a subsidy, the processing unit outputs an eligible plan as the fee plan, and in the eligible plan, the fee is set to a fixed amount of money in an initial predetermined period, and the fee is set to be lower than the fixed amount of money and to be decreased with passage of time after the predetermined period has passed.

A method of creating a fee plan according to the present disclosure includes: acquiring selection information about a vehicle or battery selected by a user, and outputting an eligible plan indicating a fee required to use a selected object selected by the user when the selected object is eligible for a subsidy, wherein in the eligible plan, the fee is set to an fixed amount of money in an initial predetermined period, and the fee is set to be lower than the fixed amount of money and to be decreased with passage of time after the predetermined period has passed.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
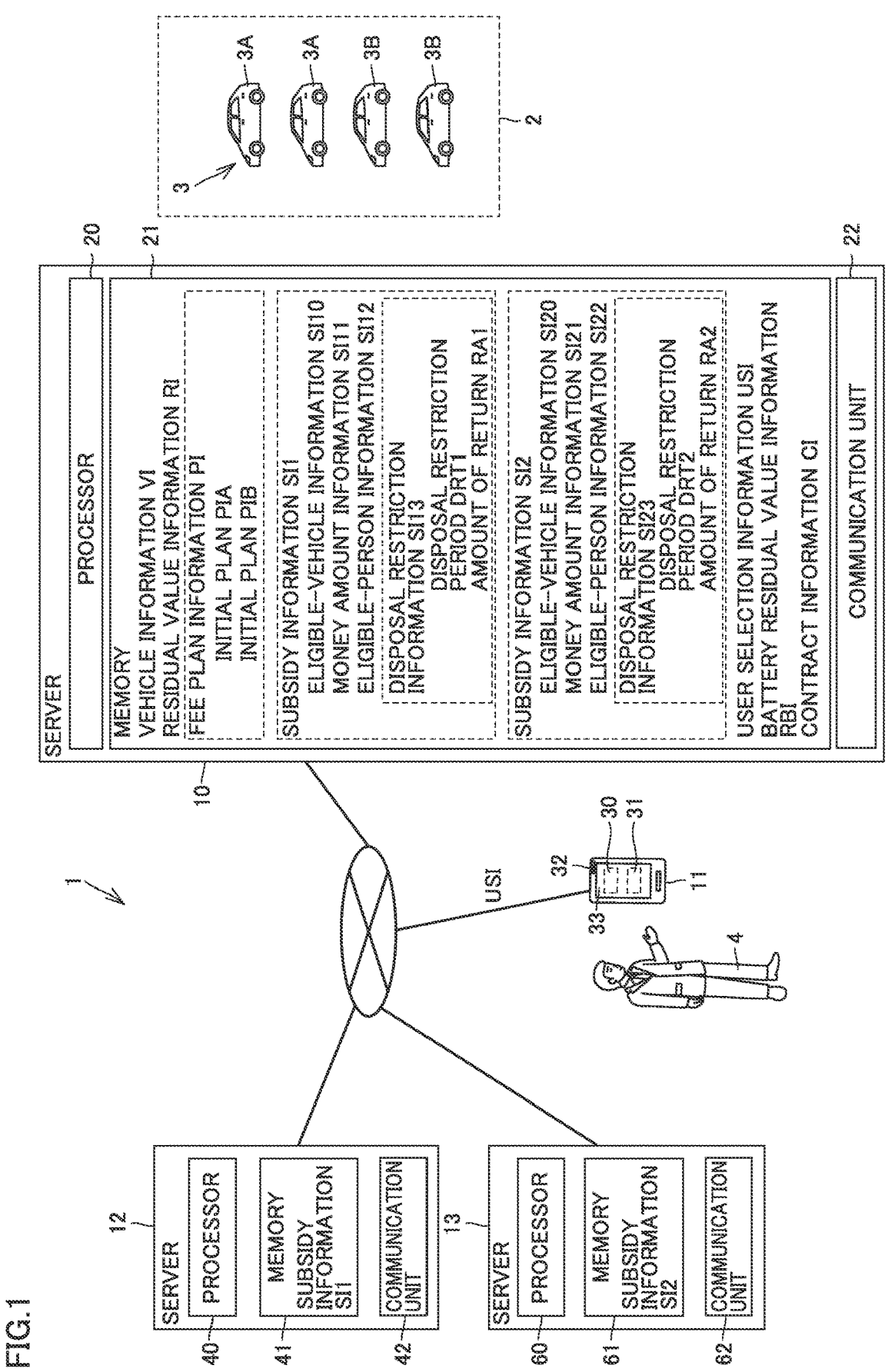
FIG. 1 is a schematic diagram schematically showing a fee plan system 1 according to the present embodiment.

A fee plan system according to each of first to third embodiments will be described with reference to FIGS. 1 to 22. It should be noted that among configurations shown in FIGS. 1 to 22, the same or substantially the same configurations are denoted by the same reference characters, and will not be described repeatedly.

First Embodiment

FIG. 1 is a schematic diagram schematically showing a fee plan system 1 according to the present embodiment. Fee plan system 1 is operated and managed by, for example, a business entity 2 that provides use of vehicles. Each of vehicles 3 is a vehicle owned by business entity 2. In the service provided by business entity 2, a user 4 can use a vehicle selected by user 4 by paying a fee to business entity 2.

The plurality of vehicles 3 include BEVs (Battery Electric Vehicles) 3A and engine vehicles 38. It should be noted that the plurality of vehicles 3 may further include any of an HEV (Hybrid Electric Vehicle), a PHEV (Plug-in Hybrid Electric Vehicle), and an FCEV (Fuel Cell Electric Vehicle).

User 4 selects a vehicle to be used in fee plan system 1. Fee plan system 1 is a system that presents a fee plan to user 4 in accordance with the vehicle selected by user 4.

Fee plan system 1 includes a server 10, a terminal 11, a server 12, and a server 13.

Server 10 is, for example, a server operated and managed by business entity 2. Examples of terminal 11 include a mobile terminal of user 4, and the like. Terminal 11 includes a processor 30, a memory 31, a communication unit 32, and a display unit 33. Display unit 33 is, for example, a screen having a touch panel function, and functions as an input unit for inputting various types of information.

For example, user 4 can use terminal 11 to select vehicle 3 to be used by user 4 in a web page of business entity 2.

Server 12 is a server operated and managed by, for example, a national government. Server 13 is a server operated and managed by, for example, a local government. For purchase of a BEV or the like, subsidies may be individually granted from the national government and the local government, and respective pieces of information about the subsidies are stored in server 12 and server 13.

Server 12 includes a processor 40, a memory 41, and a communication unit 42. Server 13 includes a processor 60, a memory 61, and a communication unit 62.

Server 10 includes a processor 20, a memory 21, and a communication unit 22. Server 10 corresponds to an "information processing device". Processor 20 corresponds to a "processing unit". Communication unit 22 corresponds to an "acquisition unit".

Communication unit 22 of server 10 communicates with terminal 11, server 12, and server 13 through the Internet.

Memory 21 of server 10 stores vehicle information VI, residual value information RI, fee plan information PI, subsidy information SI1, SI2, user selection information USI, battery residual value information RBI, and contract information CI.

Vehicle information VI is information about each vehicle 3 provided by business entity 2. Vehicle information VI includes information indicating a vehicle type of each vehicle 3. For example, vehicle information VI includes information indicating a BEV, an engine vehicle, and the like.

Fee plan information PI is information indicating a fee plan set for each vehicle 3. Residual value information RI is information indicating a residual value of each vehicle 3. Residual value information RI includes, for example, auction information for used vehicles, retail price information for used vehicles, and the like. It should be noted that server 10 regularly acquires the auction information from a server of an auction business entity (not shown). Further, server 10 is connected to a server of a used vehicle dealer (not shown), and regularly acquires the retail price information for used vehicles. In this way, residual value information R stored in memory 21 is updated.

Battery residual value information RBI is information indicating residual value information of a battery mounted on each BEV 3A. It should be noted that the battery residual value may be calculated based on a capacity retention of the battery or based on trading prices of used batteries in a trading market. Processor 20 regularly updates the information of battery residual value information RBI.

Contract information CI is information indicating contents of a contract having been already made with user 4. Contract information CI includes: information specifying a contractor; information specifying a vehicle for which the contract has been made; a contract period; information indicating a contract fee plan with which the contract has been made, and information indicating a time of start of the contract. The contract fee plan includes: information indicating a monthly fee in each contract period; and information indicating a disposal restriction period and a received subsidy when the subsidy is received.

Subsidy information SI1 is information about a subsidy to be granted from the national government with regard to, for example, purchase of a clean energy vehicle (CEV) or the like, and subsidy information SI2 is information about a subsidy to be granted from the local government for purchase of a clean energy vehicle or the like, for example.

Subsidy information SI1 includes: eligible-vehicle information SI10 indicating an eligible vehicle; money amount information SI11 indicating the subsidy to be granted; eligible-person information SI12 indicating a person eligible for the subsidy; and disposal restriction information SI13.

Eligible-vehicle information SI10 is information indicating a vehicle eligible for a subsidy. Examples of the eligible vehicle include a brand new BEV, a brand new HEV, a brand new PHEV, a brand new FCEV, and the like.

It should be noted that the vehicle eligible for a subsidy may include a used vehicle. Examples thereof may include at least one of a used REV, a used HEV, a used PHEV, and a used FCEV.

Money amount information SI11 includes information indicating an amount of money of subsidy S1 granted for the eligible vehicle. For example, money amount information SI11 includes information such as an upper limit of 600,000 yen for a brand new BEV, an upper limit of 400,000 yen for a brand new PHEV, and an upper limit of 2,250,000 yen for a brand new FCEV. When a used vehicle is also eligible, money amount information SI11 includes information such as an upper limit of 100,000 yen for a used BEV, an upper limit of 80,000 yen for a used PHEV, and an upper limit of 200,000 yen for a used FCEV, for example.

Eligible-person information SI12 is, for example, information specifying an eligible person who can receive the subsidy. For example, eligible-person information SI12 includes information indicating requirements or the like for an eligible individual person, legal person, local public entity, or the like.

Disposal restriction information SI13 includes: a disposal restriction period DRT1 during which it is obliged to own the vehicle acquired with the subsidy received; and information indicating a method of calculating an amount of return RA1 of the subsidy.

When the vehicle acquired with the subsidy received is disposed of within disposal restriction period DRT1, a whole or part of the subsidy will be returned in principle.

Subsidy information SI2 includes eligible-vehicle information SI20, money amount information SI21, eligible-person information SI22, and disposal restriction information SI23. Eligible-person information SI22 includes, for example, information indicating such a requirement that the address of the user and a primary location for use of the eligible vehicle need to be located in an area under jurisdiction of the local government. Money amount information SI21 includes information indicating subsidy S2 to be granted to the eligible vehicle. Disposal restriction information SI23 includes: information indicating a disposal restriction period DRT2; and a method of calculating an amount of return RA2.

Processor 20 regularly collects information about subsidy information SI1 from server 12 through communication unit 22, and regularly updates subsidy information SI1 stored in memory 21. Similarly, processor 20 regularly collects information about subsidy information S12 from server 13 through communication unit 22, and regularly updates subsidy information S12 stored in memory 21.

User selection information USI is information indicating a vehicle (selected object) 3 or the like selected by user 4. User 4 can use terminal 11 to select vehicle 3 to be used by user 4 in the web page of business entity 2, and selected user selection information USI is transmitted to server 10. User selection information USI includes an ID of terminal 11, user identification information specifying user 4, selected vehicle (selected object) SV by user 4, contract period information CP selected by user 4, address information AI, and primary location information HI. It should be noted that address information AI is information indicating the address of user 4. Primary location information HI is information indicating a location for use of the vehicle selected by user 4. Specifically, primary location information HI is information indicating the "primary location for use" described in a vehicle inspection certificate.

Fee plan information PI includes an initial plan PIA and an initial plan PIB. Initial plan PIA is a fee plan for BEV 3A, and is a fee plan set without taking the subsidies into consideration Initial plan PIB is a fee plan for engine vehicle 3B, and is a fee plan set without taking the subsidies into consideration.

Figure 2:
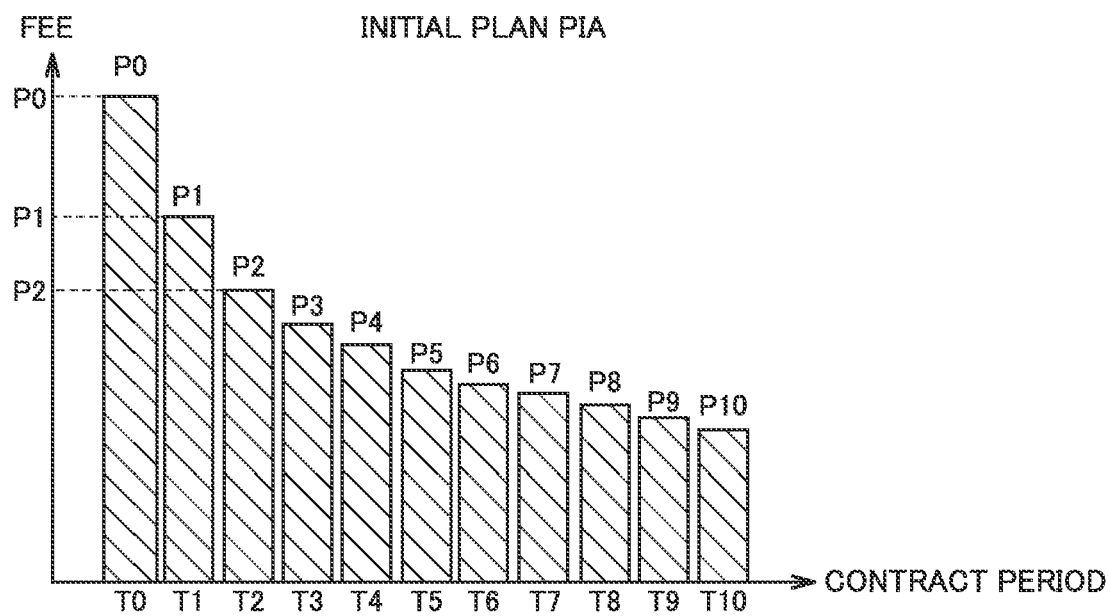
FIG. 2 is a graph showing an initial plan PIA for a BEV 3A.

FIG. 2 is a graph showing initial plan PIA for BEV 3A. In FIG. 2, the vertical axis represents a fee, and the horizontal axis represents a contract period.

"T0" represents the time of signing of the contract. Each of periods T1 to T1 represents a period of 12 months, for example. Period T1 represents a period from time T0 of signing of the contract to the 12th month, for example. Period T2 represents a period from the 12th month to the 24th month from the time of signing of the contract.

An application fee P0 represents an amount of money to be paid by user 4 at time T0 of signing of the contract. Monthly fees P1 to P10 represent amounts of money to be paid monthly by user 4 in periods T1 to T10, respectively. For example, a monthly fee P1 represents an amount of money to be paid monthly by user 4 in period T1.

In initial plan PIA of the example shown in FIG. 2, the monthly fee is set to be decreased as the contract period is longer. Specifically, monthly fee P1 is highest, and monthly fees P2, P3, P4, P5, P6, P7, P8, P9, and P10 are sequentially decreased. Each of monthly fees P1 to P10 is calculated based on the residual value of the battery mounted on BEV 3A.

Figure 3:
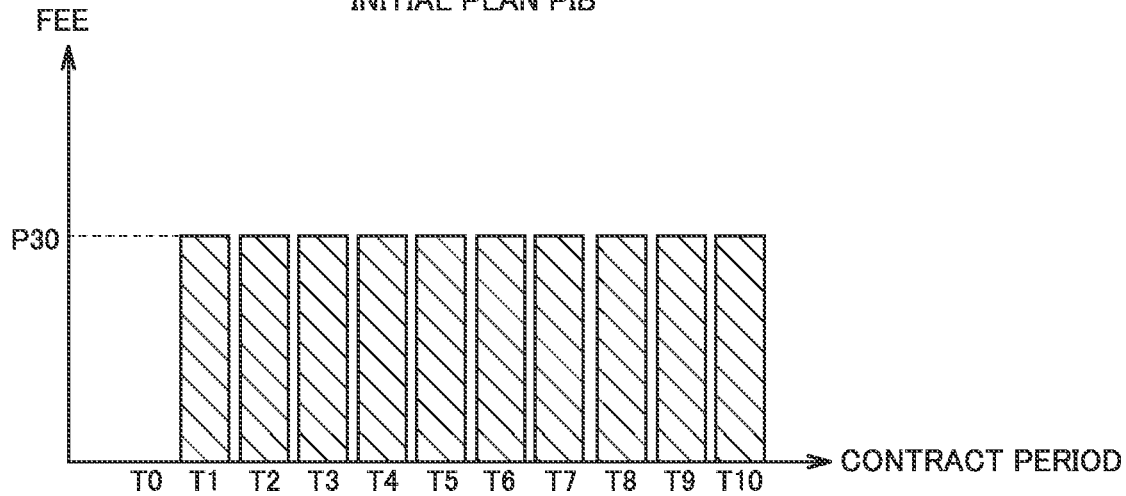
FIG. 3 is a diagram illustrating an initial plan PIB for an engine vehicle 38.

FIG. 3 is a diagram illustrating initial plan PIB for engine vehicle 3B. In the example shown in FIG. 3, each monthly fee is a fixed monthly fee P30. Thus, different initial plans are set for different vehicle types.

Here, the "fixed monthly fee" includes a case where the fee is completely the same and a case where the fee is substantially the same. The expression "substantially the same" includes, for example, a case where the fee is smaller than a difference between monthly fee P5 and monthly fee P6.

Figure 4:
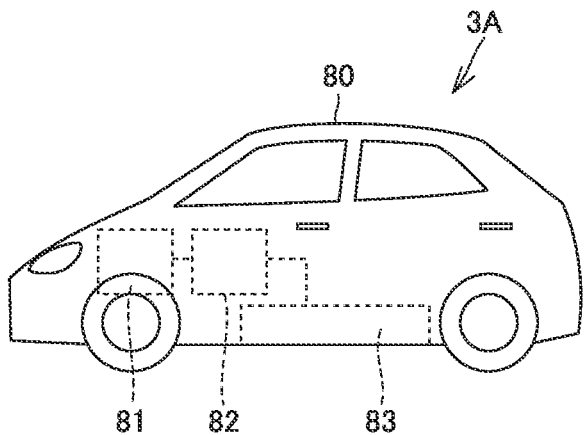
FIG. 4 is a schematic diagram schematically showing BEV 3A.

FIG. 4 is a schematic diagram schematically showing BEV 3A. BEV 3A includes a vehicle main body 80, a motor generator 81, a PCU (power control unit) 82, and a battery 83. Vehicle main body 80 includes a chassis, wheels, and the like. PCU 82 includes an inverter and a converter. Battery 83 is, for example, a lithium ion battery. Battery 83 is a battery for driving. Motor generator 81 generates motive power for driving the driving wheels using electric power supplied from battery 83 through PCU 82.

Here, the residual value of BEV 3A is greatly affected by the residual value of battery 83. Therefore, in the present embodiment, initial plan PIA of BEV 3A is calculated based on the residual value of battery 83.

Figure 5:
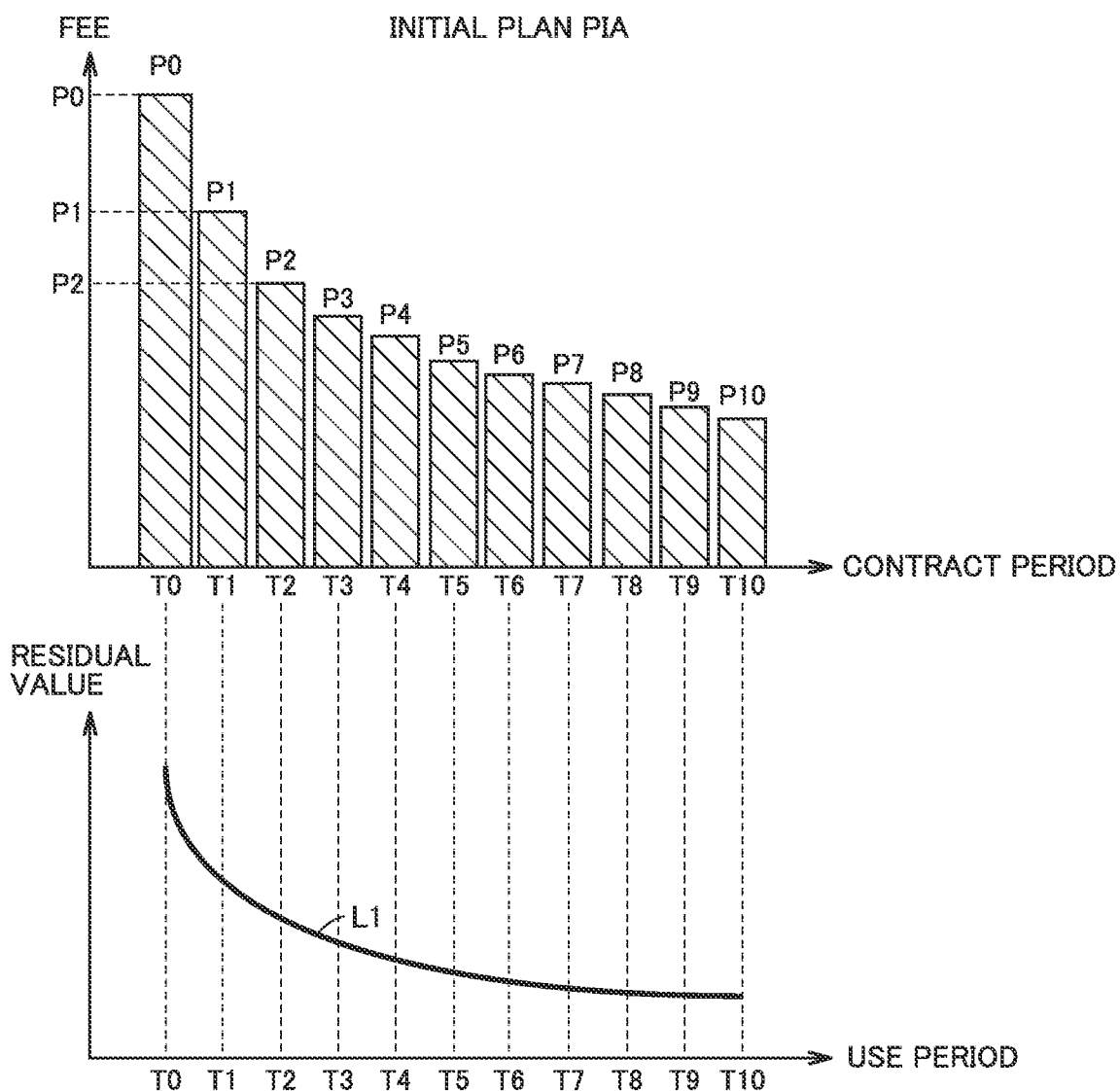
FIG. 5 is a graph showing a correlation between initial plan PIA and a residual value of a battery 83.

FIG. 5 is a graph showing a correlation between initial plan PIA and the residual value of battery 83. It should be noted that in FIG. 5, the upper graph shows initial plan PIA, and the lower graph shows the residual value of battery 83. In the graph showing the residual value of battery 83, the horizontal axis represents a use period, and the vertical axis represents an amount of money corresponding to the residual value. A residual value graph L1 represents the residual value of battery 83. The capacity retention of the lithium ion battery is decreased greatly immediately after starting to use it. Then, a degree of decrease of the capacity retention becomes smaller with passage of time in the use period.

Thus, the residual value of battery 83 tends to be greatly decreased from the beginning of use. Then, with passage of time in the use period, the degree of decrease of the residual value becomes smaller. Therefore, monthly fee P1 is set to be high in period T1 in which the degree of decrease of the residual value of battery 83 is high.

Since the degree of decrease of the residual value of battery 83 then becomes smaller after period T2, variation in the monthly fee is also smaller after period T2.

Therefore, a difference between monthly fee P2 and monthly fee P3 is smaller than a difference between monthly fee P1 and monthly fee P2.

Figure 6:
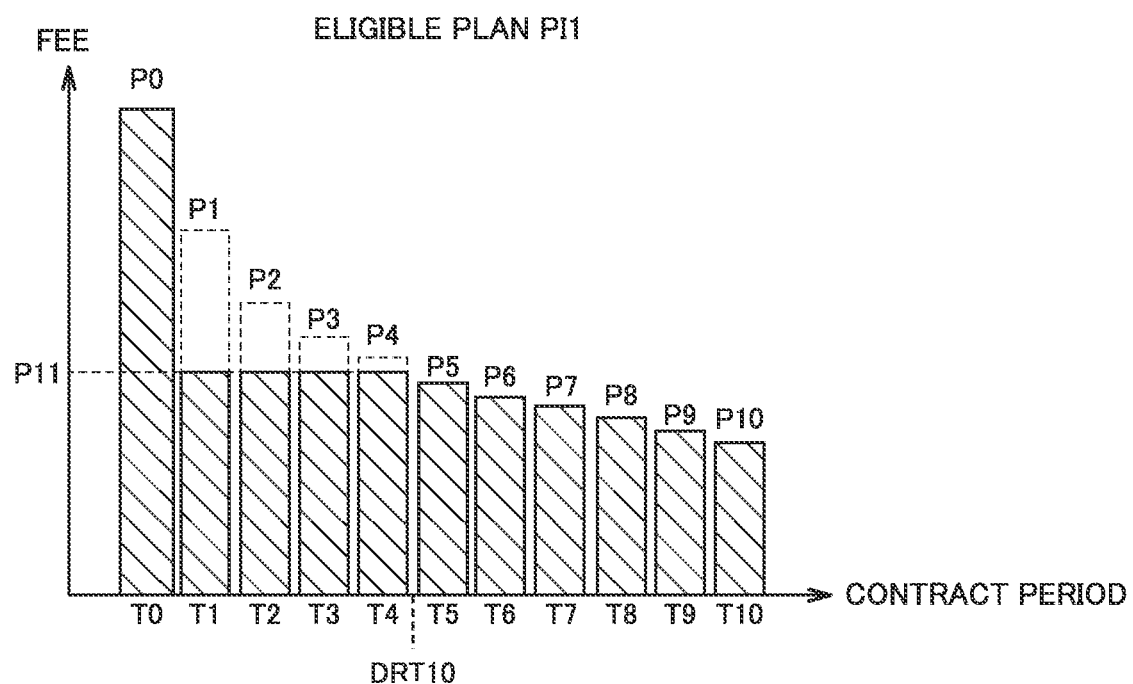
FIG. 6 is a graph showing an eligible plan PI1 that takes subsidies from a national government and a local government into consideration when BEV 3A is selected as a selected object.

FIG. 6 is a graph showing an eligible plan PI1 that takes the subsidies from the national government and the local government into consideration when BEV 3A is the selected object. It should be noted that also in FIG. 6, the vertical axis represents the fee, and the horizontal axis represents the contract period.

In eligible plan PI1, a monthly fee in each of periods T1 to T4 is set to a fixed monthly fee P11. Monthly fee P11 is set to be lower than monthly fees P1 to P4 of initial plan PIA.

A disposal restriction period DRT10 is set to be expired at a time after period T4. In the example shown in FIG. 5, disposal restriction period DRT10 is set to be expired at a time between period T4 and period T5. In other words, the monthly fee is set to fixed monthly fee P11 within disposal restriction period DRT10. It should be noted that when BEV 3A is eligible for subsidy S1 and subsidy S2, disposal restriction period DRT10 is set to a longer one of a disposal restriction period DRT1 for subsidy S1 and a disposal restriction period DRT2 for subsidy S2, for example. When BEV 3A is eligible for one of subsidy S1 and subsidy S2, disposal restriction period DRT10 is set to a corresponding one of disposal restriction periods DRT1, DRT2 for subsidies S1, S2.

In eligible plan PI1 described above, the capacity retention of battery 83 is high during a period up to period T4, so that user 4 can enjoy driving comfortably with fixed monthly fee P11.

Further, since disposal restriction period DRT10 is set to be expired at the time after period T4, the subsidy can be avoided from being obliged to be returned even if user 4 cancels the contract after passage of the period in which the fee is set to be fixed (monthly fee P11). Thus, convenience of the service provided by business entity 2 is improved for user 4.

After the passage of period T4, the capacity retention of battery 83 is relatively low and BEV 3A can be used with a low monthly fee. Therefore, with eligible plan PI1, even after the passage of period T4, user 4 can be given an incentive to continuously use BEV 3A.

The amount of money to be paid by user 4 during periods T1 to T4 in eligible plan PI1 is a value obtained by subtracting a sum of subsidies S1, S2 from the amount of money to be paid by user 4 during periods T1 to T4 in initial plan PIA. For example, when user 4 uses it until the expiration of period T4 (48 months), monthly fee P11 is represented by the following formula (1).

$$P11=(P1+P2+P3+P4)/4-(S1+S2)/48 \qquad (1)$$

For example, when user 4 selects BEV 3A and BEV 3A is not eligible for subsidy S2 from the local government, subsidy S2 is "0". When subsidy S1 is granted in this case, disposal restriction period DRT10 is set to disposal restriction period DRT1.

In eligible plan PI1, fees after period T5 are set to be the same as the fees in initial plan PIA.

It should be noted that initial plan PIA and eligible plan PI1 may be regularly updated based on residual information RI regularly updated and subsidy information SI1, SI2 regularly updated.

In FIG. 1, when the vehicle selected by user 4 using terminal 11 is eligible for subsidy S1 and subsidy S2, processor 20 outputs eligible plan PI1 shown in FIG. 4 to terminal 11 through communication unit 22.

When user 4 receives the service provided by business entity 2, user 4 accesses the web page of business entity 2 using terminal 11, and inputs a vehicle or the like desired by user 4.

Figure 7:
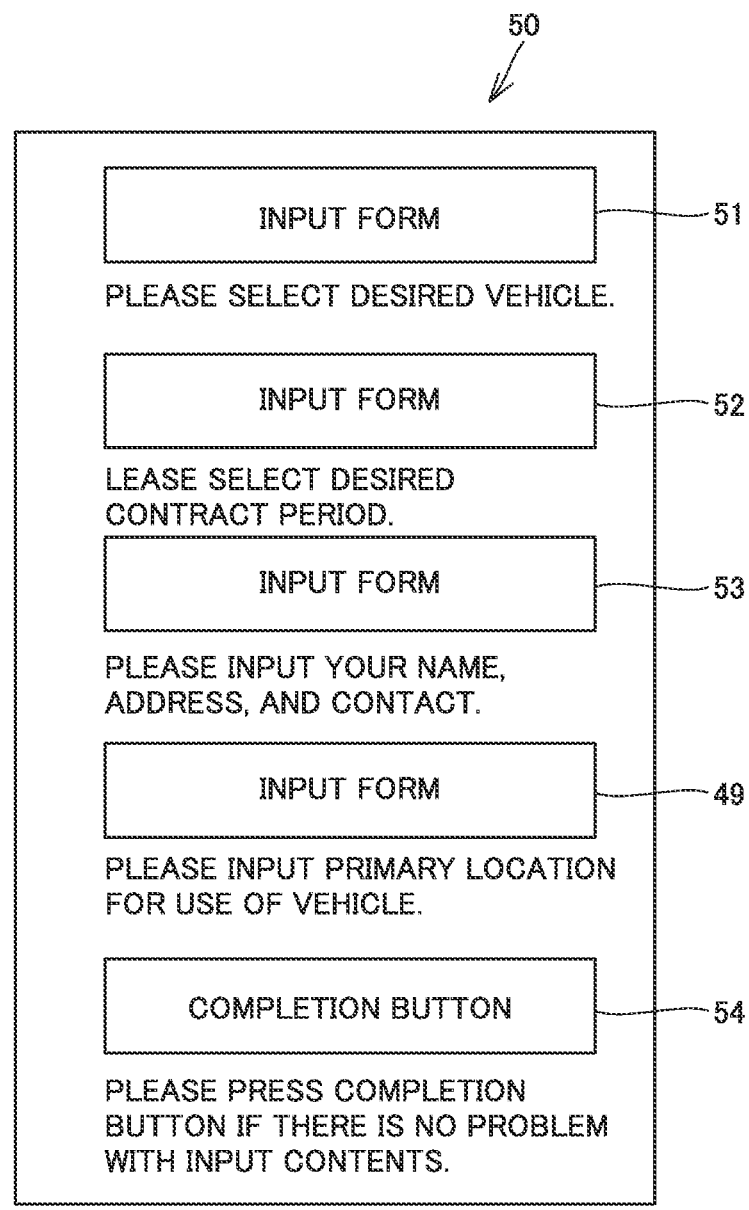
FIG. 7 is a diagram schematically showing an input screen for a web page displayed on a display unit 33 of a terminal 11.

FIG. 7 is a diagram schematically showing an input screen for the web page displayed on display unit 33 of terminal 11.

Input screen 50 includes a plurality of input forms 49, 51, 52, 53, and a completion button 54. In input form 51, user 4 selects a vehicle to be used.

In input form 52, user 4 inputs a desired contract period. It should be noted that a period to be selected in input form 52 is varied depending on the vehicle selected in input form 51. For example, when the vehicle input in input form 51 is BEV 3A, processor 20 of server 10 changes to avoid selection of a period shorter than period T4 (disposal restriction period DRT10) in input form 52. Thus, the contract period shorter than disposal restriction period DRT10 is suppressed from being set at the time of signing of the contract.

In input form 53, information specifying user 4 is input. Specifically, in input form 53, user 4 inputs information indicating the name of user 4, the address of user 4, and the contact of user 4. When user 4 presses completion button 54 after completing the input, user selection information USI is sent from terminal 11 to server 10. Thereafter, terminal 11 receives, from server 10, information indicating a fee plan for the selected vehicle.

For example, when the vehicle selected by user 4 is BEV 3A and is eligible for subsidy S1 and subsidy S2, terminal 11 receives eligible plan PI1 shown in FIG. 6 from server 10.

On the other hand, when the vehicle selected by user 4 is engine vehicle 3B and is not eligible for subsidy S1 and subsidy S2, terminal 11 receives initial plan PIB shown in FIG. 3.

Figure 8:
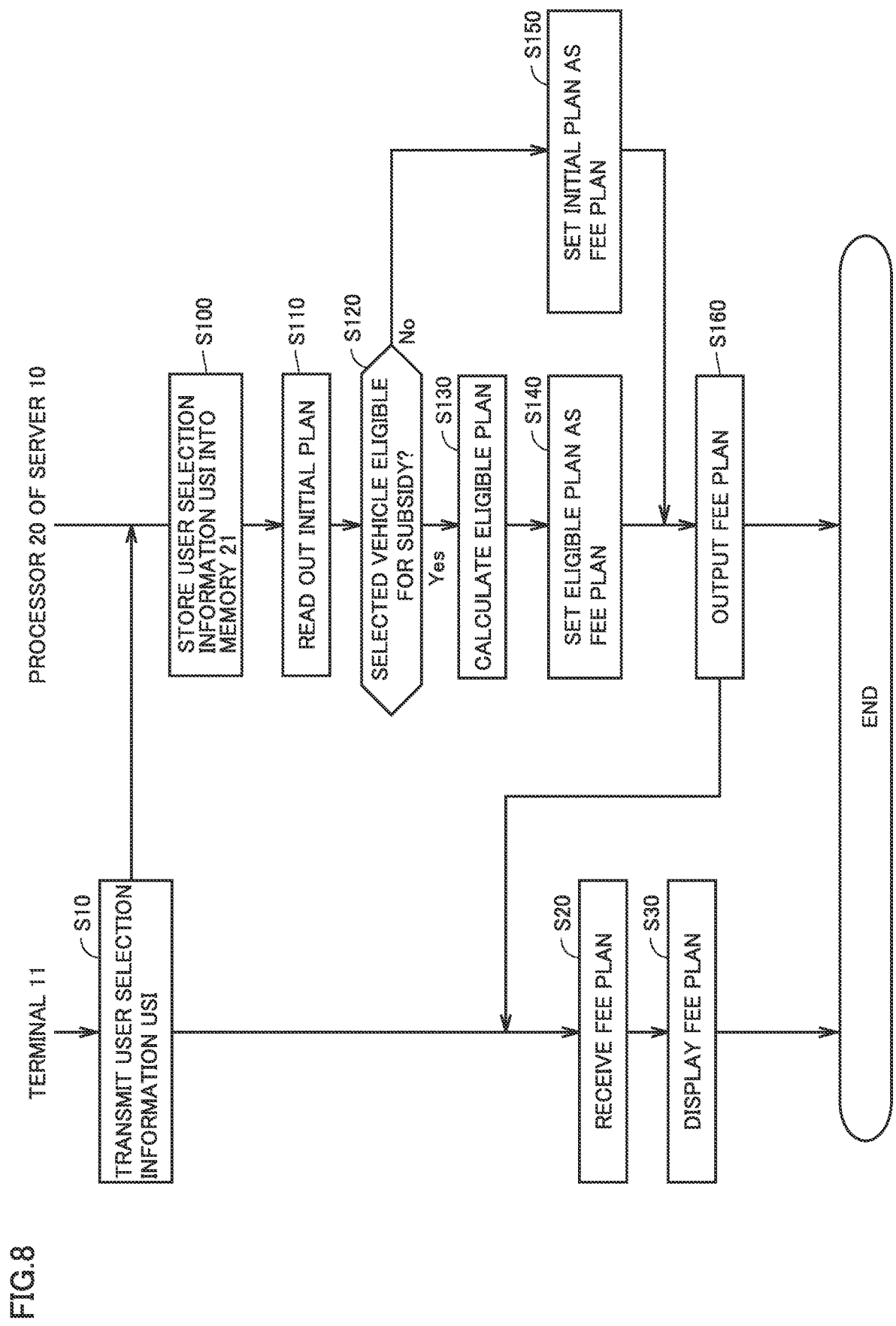
FIG. 8 is a flowchart showing a flow from selection of a vehicle by a user 4 using terminal 11 to output of a fee plan to terminal 11.

FIG. 8 is a flowchart showing a flow from the selection of the vehicle by user 4 using terminal 11 to the output of the fee plan to terminal 11.

When user 4 presses completion button 54, terminal 11 transmits user selection information USI to server 10 (S10).

Processor 20 of server 10 stores user selection information USI into memory 21 (S100).

Processor 20 reads out initial plan PIA corresponding to the selected vehicle (S110). Specifically, processor 20 reads out initial plan PA corresponding to the selected vehicle from memory 21 in accordance with selected-vehicle information SV of user selection information USI and fee plan information P1.

Processor 20 determines whether or not the selected vehicle selected by user 4 is eligible for a subsidy (S120).

Specifically, processor 20 determines whether or not the selected vehicle selected by user 4 is eligible for a subsidy based on user selection information USI and eligible-vehicle information SI10, SI20 of subsidy information SI1, SI2 stored in memory 21.

When the vehicle selected by user 4 is included in at least one of eligible-vehicle information SI10 and eligible-vehicle information SI20, processor 20 determines that the selected vehicle is eligible for a subsidy.

Figure 9:
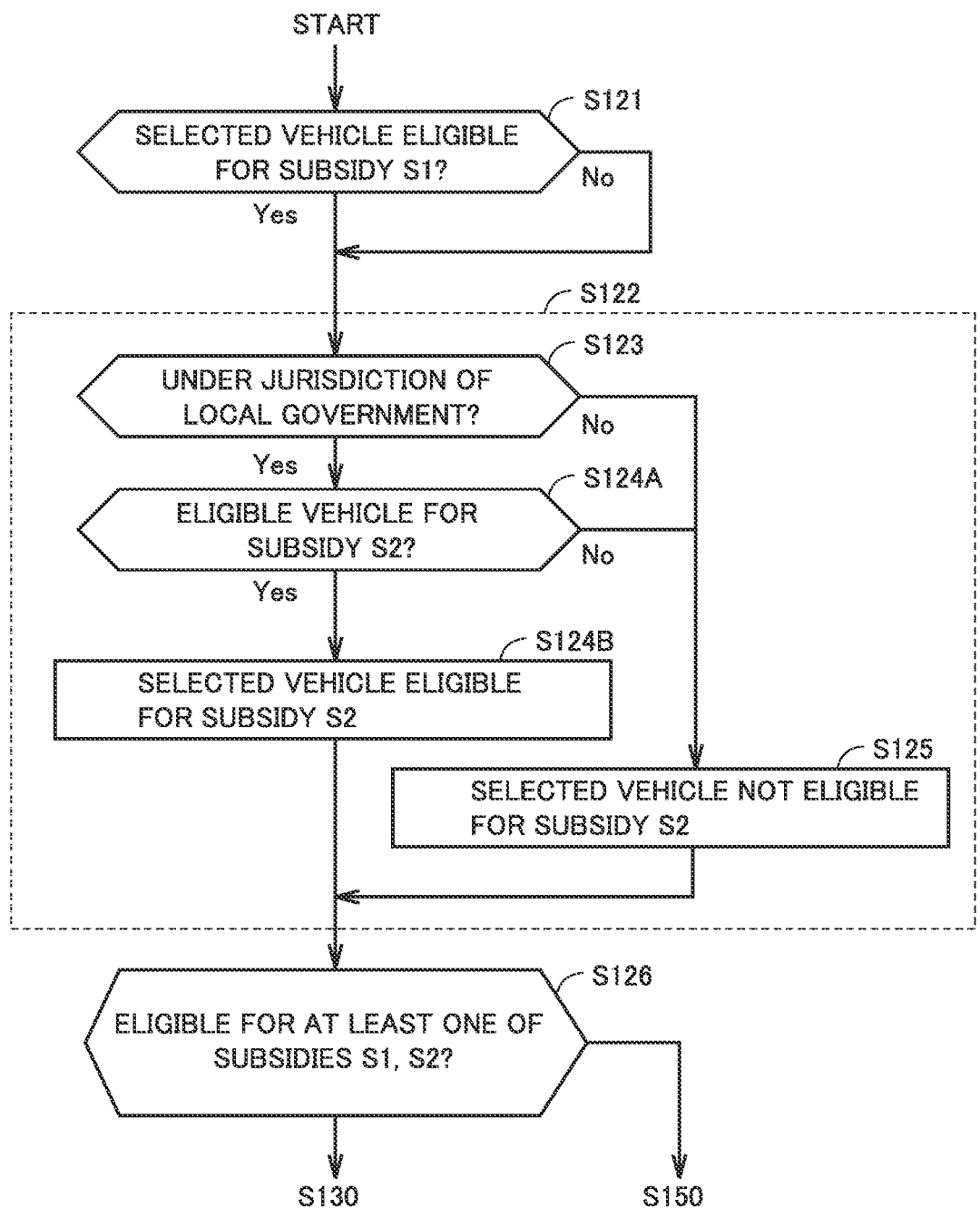
FIG. 9 is a flowchart showing a detail of a step S120.

FIG. 9 is a flowchart showing a detail of step SI20. Processor 20 performs: a step S121 of determining whether or not the selected vehicle selected by user 4 is eligible for subsidy S1; and a step S122 of determining whether or not the selected vehicle selected by user 4 is eligible for subsidy S2.

In step S121, processor 20 makes the determination based on selected-vehicle information SV included in user selection information USI and eligible-vehicle information SI10 included in subsidy information SI1. For example, processor 20 specifies the selected vehicle selected by user 4 based on selected-vehicle information SV. When the selected vehicle is included in the eligible vehicles of eligible-vehicle information SI10, processor 20 determines that the selected vehicle is eligible for subsidy S1 (Yes in S121). When the selected vehicle is not included in the eligible vehicles of eligible-vehicle information SI10, processor 20 determines that the selected vehicle is not included in the eligible vehicles (No in S121).

In step S122, processor 20 makes the determination based on primary location information HI, address information AI, and selected-vehicle information SV included in user selection information USI, as well as eligible-vehicle information SI20 and eligible-person information SI22 included in subsidy information SI2.

Specifically, processor 20 determines whether or not both the address of user 4 and the primary location for use of the eligible vehicle are within an area under jurisdiction of the local government that is to grant subsidy S2 (S123).

When processor 20 determines that both the address of user 4 and the primary location for use of the eligible vehicle are within the area under jurisdiction of the local government that is to grant subsidy S2 (Yes in S123), processor 20 determines whether or not the selected vehicle is an eligible vehicle for subsidy S2 (S124). When processor 20 determines that the selected vehicle is an eligible vehicle for subsidy S2 (Yes in S124), processor 20 determines that the selected vehicle is eligible for subsidy S1 (S125).

On the other hand, when processor 20 determines that at least one of the address of user 4 and the primary location for use of the eligible vehicle is outside the area under jurisdiction of the local government that is to grant subsidy S2 (No in S123), processor 20 determines that the selected vehicle is not eligible for subsidy S2 (S125). Further, when processor 20 determines that the selected vehicle is not an eligible vehicle for subsidy S2 (No in S124), processor 20 determines that the selected vehicle is not eligible for subsidy S2 (S125).

When processor 20 determines that the selected vehicle is eligible for at least one of subsidies S1, S2, processor 20 proceeds to a process of a step S130 shown in FIG. 8, whereas when processor 20 determines that the selected vehicle is eligible for none of subsidies S1, S2, processor 20 proceeds to a process of a step S150 shown in FIG. 8.

It should be noted that in the example shown in the figure, the determination is made based on subsidy information SI1, SI2 stored in memory 21; however, inquiries may be made to servers 12, 13.

Returning to FIG. 8, when processor 20 determines that the vehicle is an eligible vehicle for a subsidy (Yes in S120), processor 20 calculates an eligible plan for the vehicle selected by user 4 (S130).

Processor 20 calculates the eligible plan based on the initial plan read out in S110 and subsidy information SI1, SI2.

For example, when the vehicle selected by user 4 is BEV 3A and is eligible for subsidy S1 and subsidy S2, the monthly fee is calculated based on initial plan PIA shown in FIG. 2, the above-described formula (1), and subsidy information SI1, SI2, thereby calculating eligible plan PI1 illustrated in FIG. 6.

Processor 20 sets eligible plan PI1 as a fee plan (S140). When processor 20 determines that the selected vehicle selected by user 4 is not eligible for a subsidy (No in S120), processor 20 sets the initial plan as the fee plan (S150).

For example, when the vehicle selected by user 4 is engine vehicle 3B and is not eligible for subsidy S1 and subsidy S2, processor 20 sets initial plan PIB as the fee plan. On the other hand, when the vehicle selected by user 4 is BEV 3A and is not eligible for subsidy S1 and subsidy S2, processor 20 transmits initial plan PIA.

Then, processor 20 transmits the fee plan to terminal 11 through communication unit 22 (S160). Terminal 11 receives the fee plan from server 10 (S20).

Terminal 11 displays the received fee plan (S30). Thus, user 4 can check the fee plan.

In the above-described example, initial plan PIA of BEV 3A is set based on the residual value of battery 83, but initial plan PIA is not limited to this example.

Figure 10:
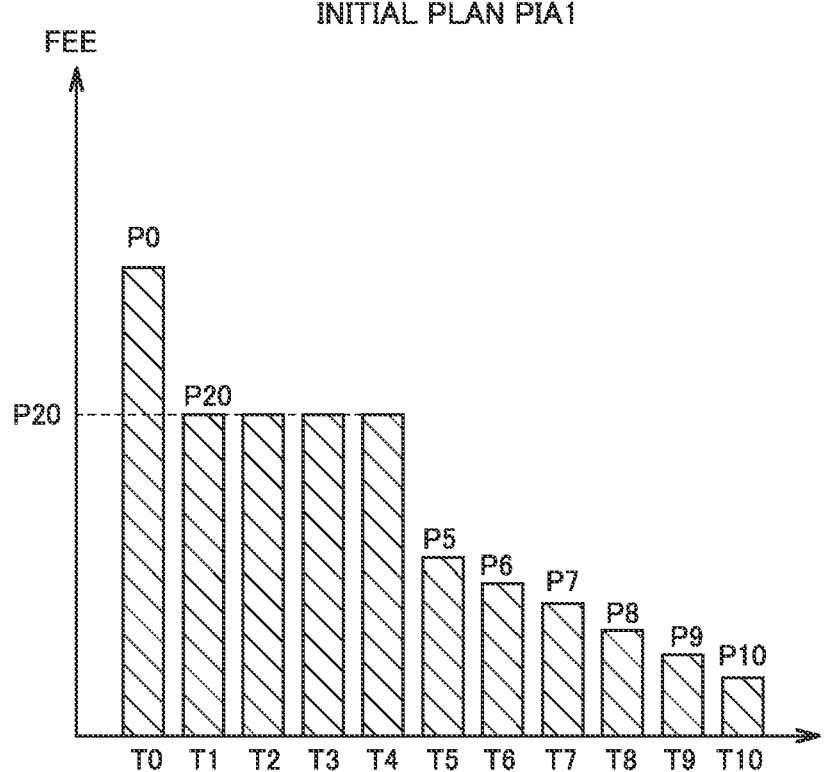
FIG. 10 is a graph showing an initial plan PIA1 serving as a modification of initial plan PIA.

FIG. 10 is a graph showing an initial plan PIA1 serving as a modification of initial plan PIA. In initial plan PIA1, each of monthly fees up to period T4 is set to a fixed monthly fee P20. Initial plan PIA1 may be set in this manner. Monthly fees P6 to P10 after period T4 are set to be decreased at a certain rate with passage of time.

Figure 11:
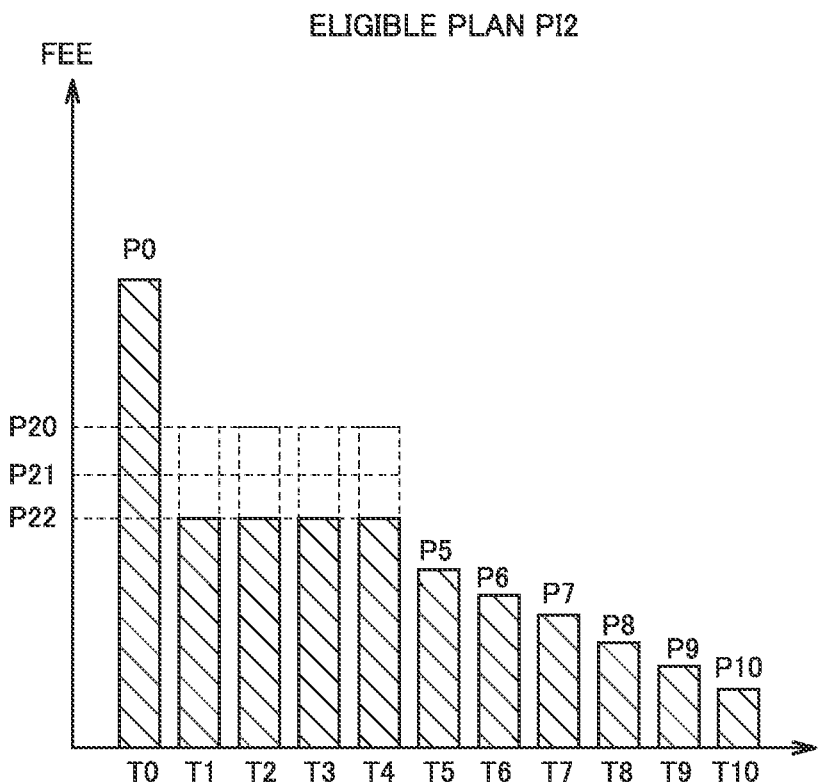
FIG. 11 is a graph showing an eligible plan PI2 when BEV 3A is eligible for a subsidy S1 and a subsidy S2.

FIG. 11 is a graph showing an eligible plan PI12 when BEV 3A is eligible for subsidy S1 and subsidy S2.

In eligible plan PI2, each of monthly fees up to period T4 is set to a fixed monthly fee P22. It should be noted that monthly fee P22 is set between monthly fee P20 and monthly fee P5.

It should be noted that in FIG. 11, a "monthly fee P21" represents each of monthly fees up to period T4 when BEV 3A is eligible only for subsidy S1. In this case, each of the monthly fees up to period T4 is set to fixed monthly fee P21. It should be noted that monthly fee P21 is set between monthly fee P20 and monthly fee P22.

Thus, for initial plan PIA, various types of fee settings can be considered; however, in the eligible plan that takes the subsidies into consideration, each of the monthly fees up to period T4 on the time T0 side with respect to the disposal restriction period is set to be fixed.

In the first embodiment described above, at the time of signing of the contract, a contract period shorter than disposal restriction period DRT10 is suppressed from being set, but user 4 may cancel the contract within disposal restriction period DRT10. In this case, server 10 outputs, to terminal 11, an amount of return of the subsidy resulting from the cancellation.

Figure 12:
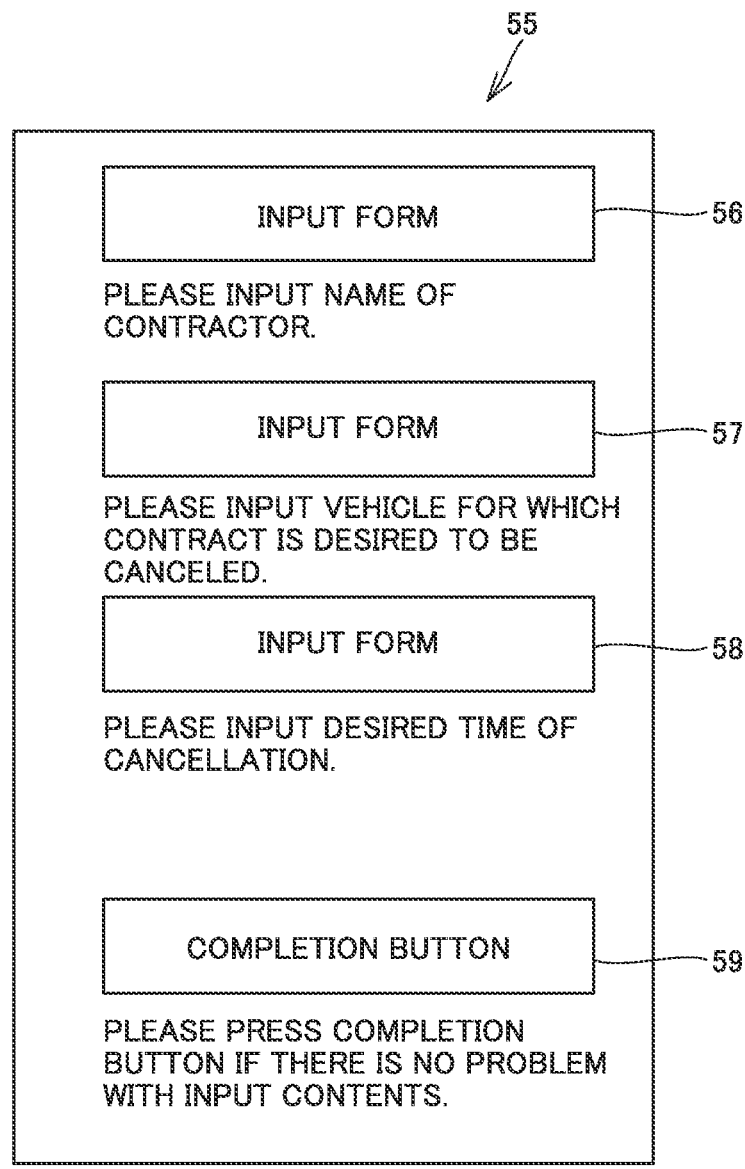
FIG. 12 is a diagram showing a cancellation form 55 displayed on display unit 33 of terminal 11.

For the cancellation, user 4 provides an input for the cancellation at terminal 11. FIG. 12 is a diagram showing a cancellation form 55 displayed on display unit 33 of terminal 11.

Cancellation form 55 includes an input form 56, an input form 57, an input form 58, and a completion button 59. Input form 56 is a form for inputting information specifying the contractor. Input form 57 is a form for specifying the vehicle desired to be canceled. Input form 58 is a form for inputting a time of cancellation. When the inputs to input forms 56, 57, 58 are completed, user 4 presses completion button 59. When completion button 59 is pressed, a cancellation request signal CR is transmitted from terminal 11 to server 10.

Cancellation request signal CR includes: information specifying the contractor who desires cancellation; information specifying the vehicle desired to be canceled, and information specifying the desired time of cancellation.

Figure 13:
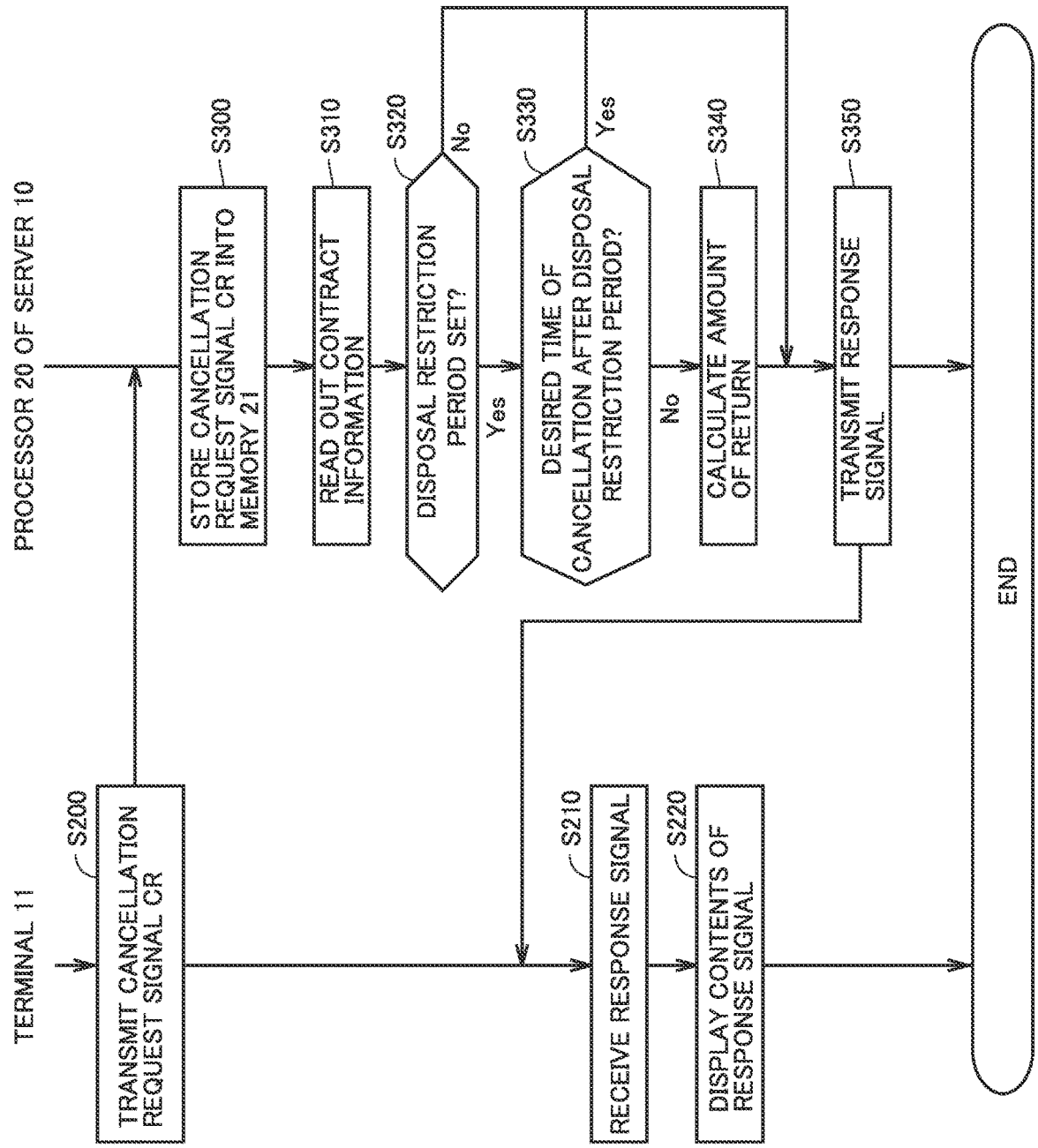
FIG. 13 is a diagram showing a flow until information indicating an amount of return of the subsidy is output from a server 10 to terminal 11 after a cancellation request signal CR is transmitted from terminal 11.

FIG. 13 is a diagram showing a flow until information indicating the amount of return of the subsidy is output from server 10 to terminal 11 after cancellation request signal CR is transmitted from terminal 11.

Terminal 11 transmits cancellation request signal CR to server 10 (S200). Processor 20 of server 10 stores cancellation request signal CR into memory 21 (S300).

Processor 20 reads out contract information CI of user 4 from memory 21 based on cancellation request signal CR (S310). Processor 20 determines whether or not a disposal restriction period is set, based on the contract fee plan included in contract information CI (S320).

When processor 20 determines that the disposal restriction period is set (Yes in S320), processor 20 determines whether or not the desired time of cancellation is a time after the disposal restriction period (S330).

When processor 20 determines that the desired time of cancellation is within the disposal restriction period (No in S320), processor 20 calculates an amount of return of a subsidy (S340).

Processor 20 calculates respective amounts of return of subsidies S1, S2 based on methods of calculating amounts of return RA1 and RA2 included in subsidy information SI1, SI2 and the desired time of cancellation included in cancellation request signal CR (S340).

Processor 20 outputs a response signal RS including information indicating the amounts of return (S350). It should be noted that when it is determined that the disposal restriction period is not set (No in S320) or when it is determined that the desired time of cancellation is a time after the disposal restriction period (Yes in S330), processor 20 outputs a response signal RS indicating that there is no amount of return (S350).

When terminal 11 receives response signal RS (S210), terminal 11 displays the contents of response signal RS on display unit 33 (S220). Thus, user 4 can know whether or not a subsidy should be returned and can know an amount of return of the subsidy.

Second Embodiment

Figure 14:
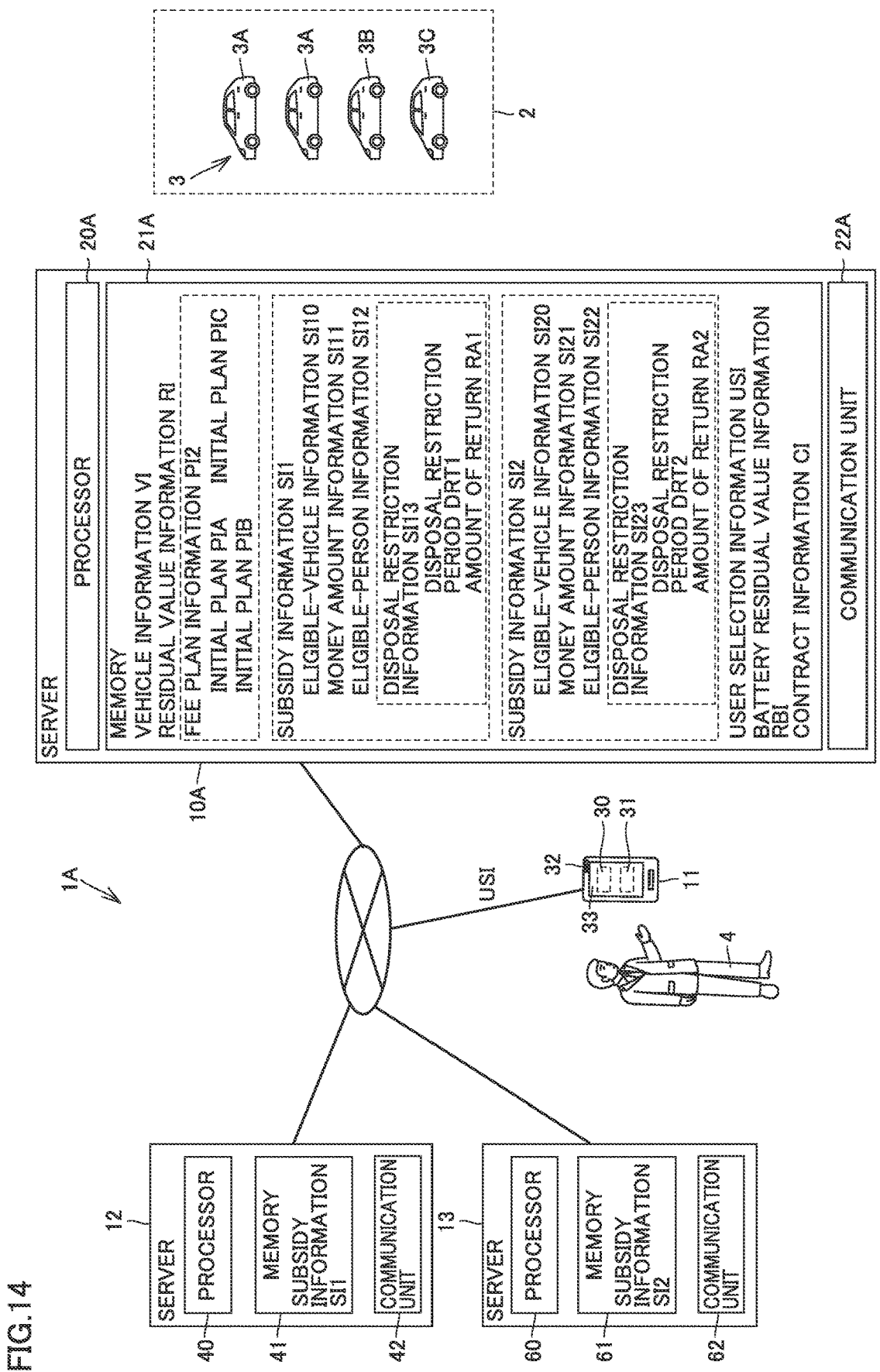
FIG. 14 is a schematic diagram schematically showing a fee plan system 1A.

A fee plan system 1A according to a second embodiment will be described with reference to FIG. 14 and the like. In the second embodiment, business entity 2 provides a service using BEVs 3A, an engine vehicle 3B, and a used BEV 3C serving as a used vehicle. FIG. 14 is a schematic diagram schematically showing fee plan system 1A.

Used BEV 3C is, for example, the BEV having been used by user 4 in the first embodiment. For example, user 4 may place the contract period for use of BEV 3A to be expired at the end of period T5. After the expiration of the contract period, BEV 3A is returned to business entity 2.

In the second embodiment, business entity 2 provides a service using, as used BEV 3C, BEV 3A having been used, and business entity 2 provides the service using BEVs 3A, engine vehicle 3B, and used BEV 3C. User 4 can use BEVs 3A, engine vehicle 3B, and used BEV 3C by paying predetermined fees.

Fee plan system 1A includes a server 10A, a terminal 11, a server 12, and a server 13. Server 10A includes a processor 20A, a memory 21A, and a communication unit 22A.

Memory 21A stores fee plan information PI. Fee plan information PI includes an initial plan PIA, an initial plan PIB, and an initial plan PIC.

Initial plan PIC is a fee plan for used BEV 3C and is a plan that does not take subsidies S1, S2 into consideration.

Figure 15:
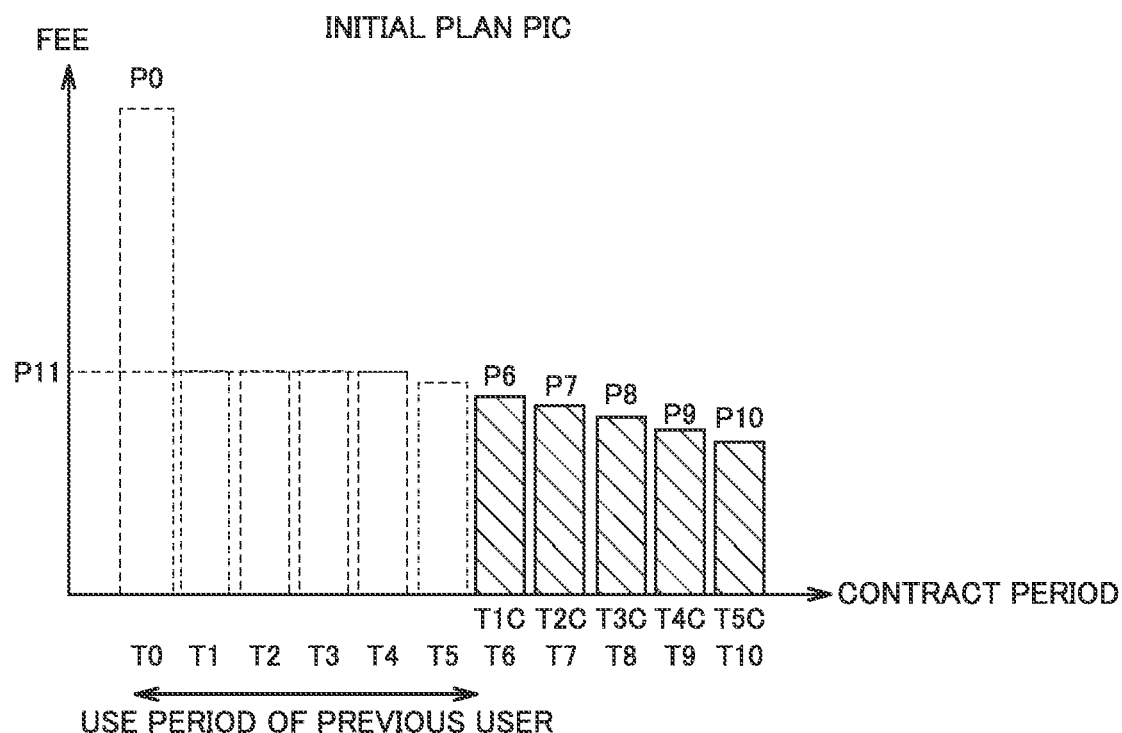
FIG. 15 shows an exemplary initial plan PIC.

FIG. 15 shows an exemplary initial plan PIC. It should be noted that in the example shown in FIG. 12, initial plan PIC is illustrated as an initial plan PIC when the previous user has used it up to period T5.

In FIG. 15, each of periods T1C to T5C represents a period of 12 months, for example. Period T1C represents a period from the time of signing of the contract to the 12th month, and period T2B represents a period from the 12th month to the 24th month. Monthly fees in periods T1C, T2C, T3C, T4C, and T5C are monthly fees P6, P7, P8, P9, and P10, respectively.

Thus, periods T1C, T2C, T3C, T4C, and T5C of initial plan PIC correspond to periods T6, T7, T8, T9, and T10 of initial plan PIA. That is, initial plan PIC of used BEV 3C, which is BEV 3A having been used by previous user 4, is the same as the fee plan after the use period of initial plan PIA.

Here, even when used BEV 3C is used, used BEV 3C may be eligible for subsidies S1, S2.

Figure 16:
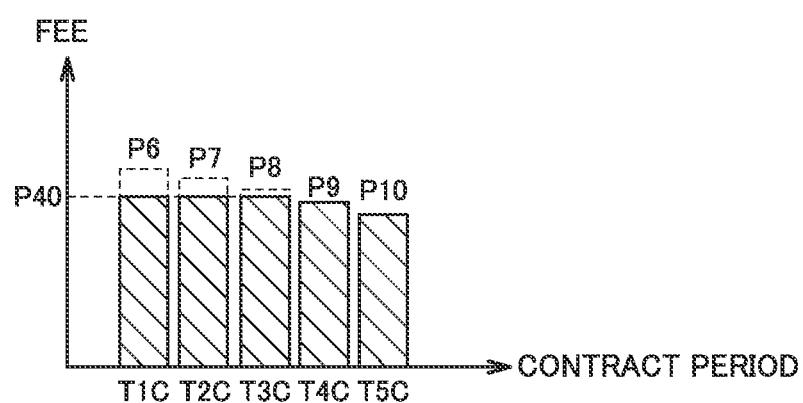
FIG. 16 is a graph showing an eligible plan PI3 that takes subsidies S1, S2 into consideration with regard to a used BEV 3C.

FIG. 16 is a graph showing an eligible plan PI3 that takes subsidies S1, S2 into consideration with regard to used BEV 3C. In the example shown in FIG. 13, each of the monthly fees in periods T1C to T3C is set to a fixed monthly fee P40.

It should be noted that when the disposal restriction period is set in each of subsidies S1, S2, period T3C is set such that the end date of the disposal restriction period is after period T3C.

Monthly fee P40 is an amount of money obtained by subtracting subsidies S1, S2 from an amount of money to be paid by user 4 in period T1C to period T3C.

It should be noted that when user 4 selects used BEV 3C, server 10A outputs the fee plan for used BEV 3C to terminal 11 in accordance with the same control flow as the flow shown in FIG. 8.

Specifically, server 10A receives user selection information USI, and processor 20A stores user selection information USI into memory 21A (S100). When used BEV 3C is selected in user selection information USI, processor 20A reads out initial plan PIC from memory 21A (S110). When it is determines that used BEV 3C is eligible for a subsidy (Yes in SI20), processor 20A calculates an eligible plan PI3 (S130), and sets eligible plan PI3 as the fee plan (S140).

On the other hand, when it is determined that used BEV 3C is not eligible for a subsidy (No in S120), initial plan PIC is set to the fee plan (S150). Then, processor 20A transmits the fee plan to terminal 11 (S160).

Third Embodiment

Figure 17:
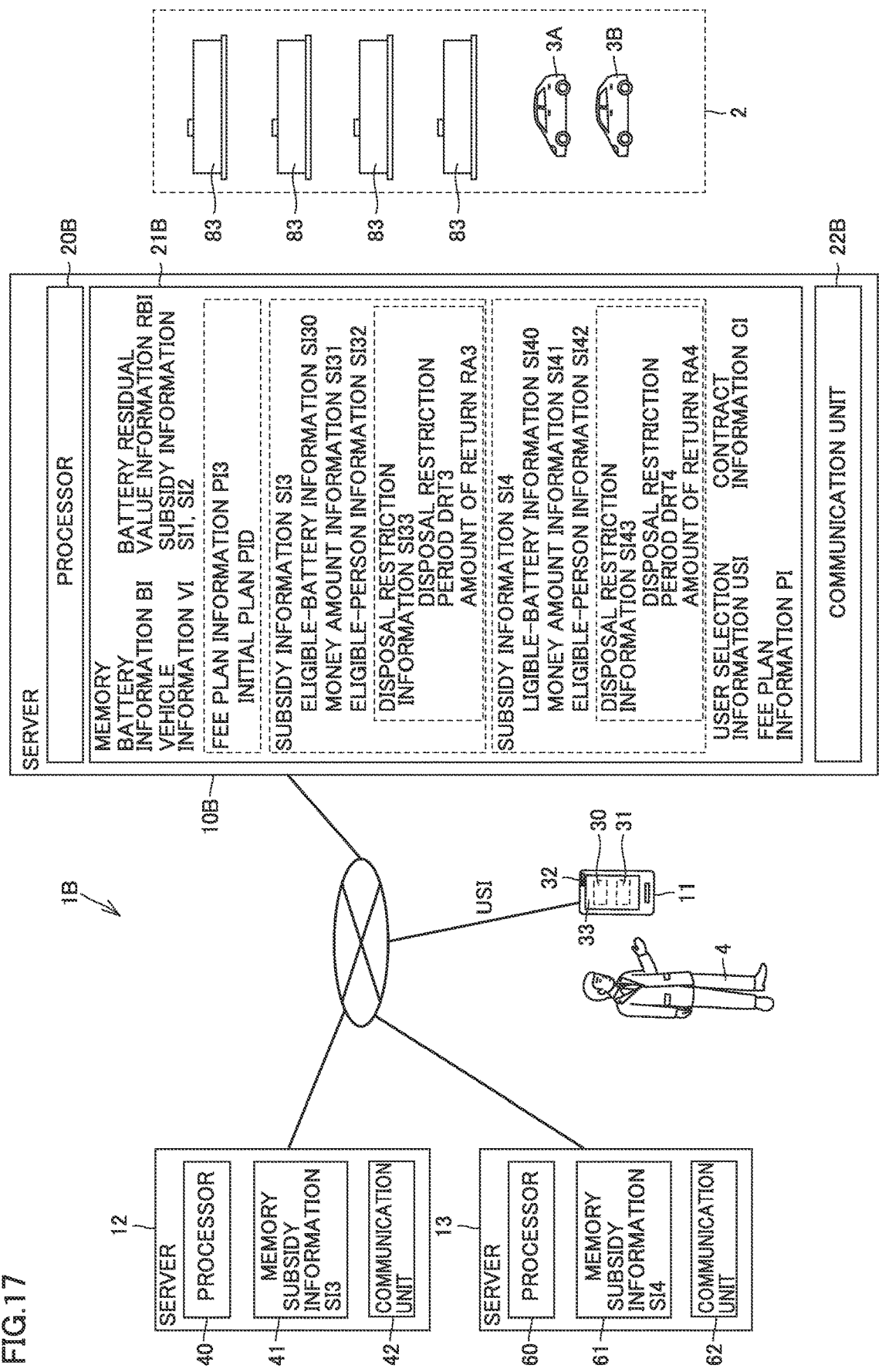
FIG. 17 is a schematic diagram schematically showing a fee plan system 1B.

A fee plan system 1B according to the present embodiment will be described with reference to FIG. 17 and the like. FIG. 17 is a schematic diagram schematically showing fee plan system 1B. In the example shown in FIG. 17, business entity 2 provides a service of providing batteries 83 attachable to BEVs 3D, a BEV 3A, and an engine vehicle 38.

Figure 18:
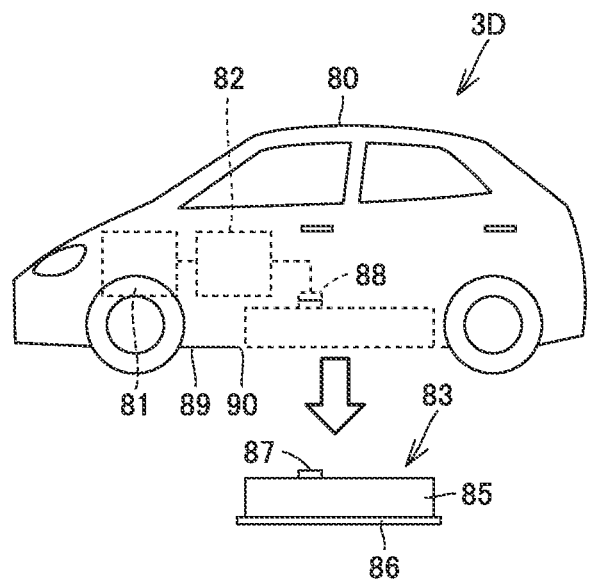
FIG. 18 is a diagram schematically showing a BEV 3D.

FIG. 18 is a diagram schematically showing a BEV 3D. BEV 3D includes a battery 83 and battery 83 is detachable from vehicle main body 80.

Vehicle main body 80 includes a floor panel 89 that constitutes a bottom surface of BEV 3D, and an opening 90 is formed in floor panel 89.

Battery 83 includes a battery main body 85, a mounting plate 86, and a connector 87. Battery main body 85 is, for example, a lithium ion battery. Battery main body 85 is fixed to the upper surface of mounting plate 86. Mounting plate 86 is formed to close opening 90. Mounting plate 86 is fixable to floor panel 89 with opening 90 being closed. Connector 87 is connectable to a connector 88 provided in vehicle main body 80, and when connector 87 and connector 88 are connected to each other, PCU 82 and battery main body 85 are electrically connected to each other.

In BEV 3D configured as described above, user 4 owns vehicle main body 80. User 4 can use battery 83 owned by business entity 2 by paying a monthly fee to business entity 2 in accordance with a predetermined fee plan. In order to use battery 83 for which the contract has been made, battery 83 is attached to BEV 3D of user 4 in a factory owned by business entity 2, for example. Of course, user 4 can purchase and own a vehicle main body of a BEV 3D having a battery 83 attached to vehicle main body 80 in advance, and user 4 can pay a monthly fee to business entity 2 for battery 83 in order to use BEV 3D.

Business entity 2 uses fee plan system 1B to provide a service with regard to batteries 83, BEV 3A, and engine vehicle 3B.

It should be noted that in the third embodiment, user 4 can also select BEV 3A or engine vehicle 3B. On the other hand, the case where user 4 selects BEV 3A or engine vehicle 38 is substantially the same as in the first embodiment, so that detailed description thereof will not be provided.

Fee plan system 1B includes a server 10B, a terminal 11, a server 12, and a server 13.

Memory 41 of server 12 stores subsidy information S13 about a subsidy for battery. Memory 61 of server 13 stores subsidy information S14.

Server 10B includes a processor 20B, a memory 21B, and a memory 21B. Memory 218 includes battery information BI, battery residual value information RBI, fee plan information PI, subsidy information SI3, SI4, user selection information USI, and contract information CI.

Subsidy information SI3 includes eligible-battery information SI30, money amount information SI31, eligible-person information SI32, and disposal restriction information SI33. The disposal restriction information SI33 includes a disposal restriction period DRT3 and information indicating a method of calculating an amount of return RA3. Battery information BI is information about battery 83 owned by business entity 2.

Figure 19:
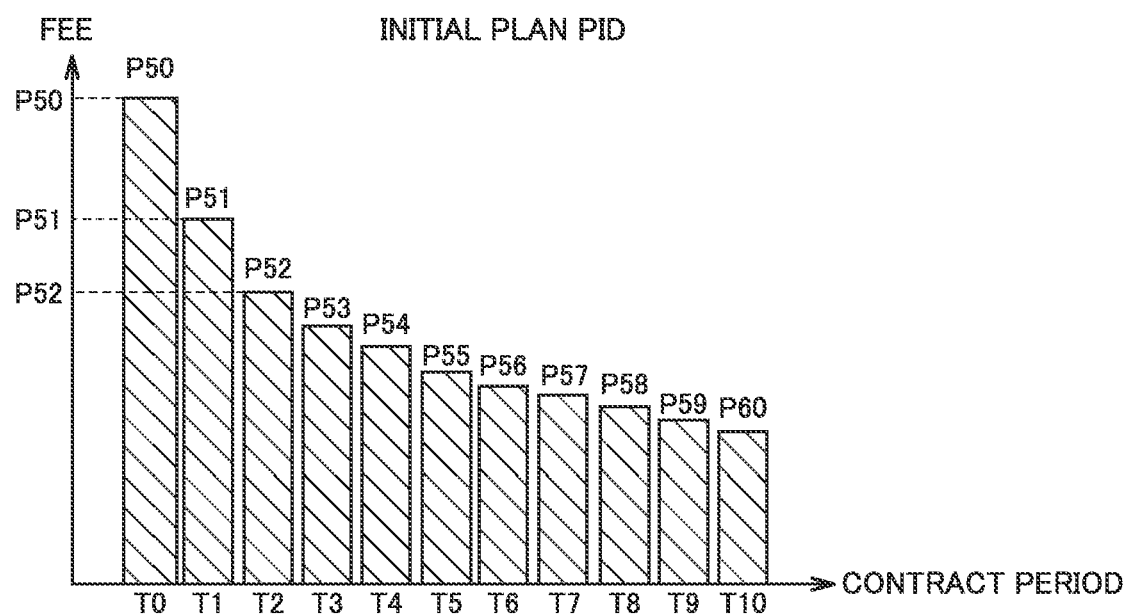
FIG. 19 is a graph showing an initial plan PID.

Fee plan information PI includes an initial plan PID for battery 83. FIG. 19 is a graph showing initial plan PID.

As with initial plan PIA, initial plan PID is also set based on the residual value of battery 83. Specifically, processor 20B calculates initial plan PID based on battery residual value information RBI stored in memory 21.

Therefore, a monthly fee P51 in period T1 is highest, and the monthly fee is set to be decreased as the contract period becomes longer. As the time is closer to the start of the contract, a decrease P in the monthly fee is set to be larger. It should be noted that initial plan PID may be regularly updated based on the battery residual value information RBI that is regularly updated.

Figure 20:
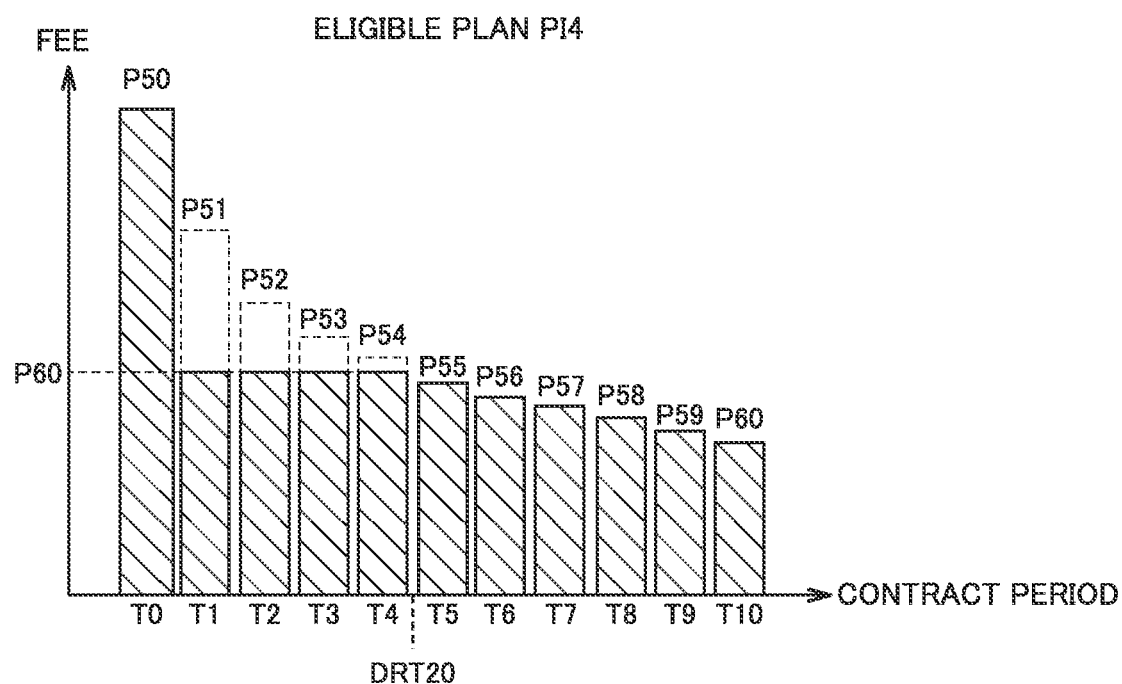
FIG. 20 is a graph showing an eligible plan PI4 that takes subsidies S3, S4 into consideration.

FIG. 20 is a graph showing an eligible plan PI4 that takes subsidies S3, S4 into consideration. Also in eligible plan PI4, each of monthly fees in periods T1 to T4 is set to a fixed monthly fee P60.

Disposal restriction period DRT20 is a longer one of disposal restriction period DRT3 and disposal restriction period DRT4. Period T4 is set such that the end date of disposal restriction period DRT20 is after period T4.

In fee plan system 1B configured as described above, user 4 can use terminal 11 to obtain the fee plan for the battery provided by business entity 2.

Figure 21:
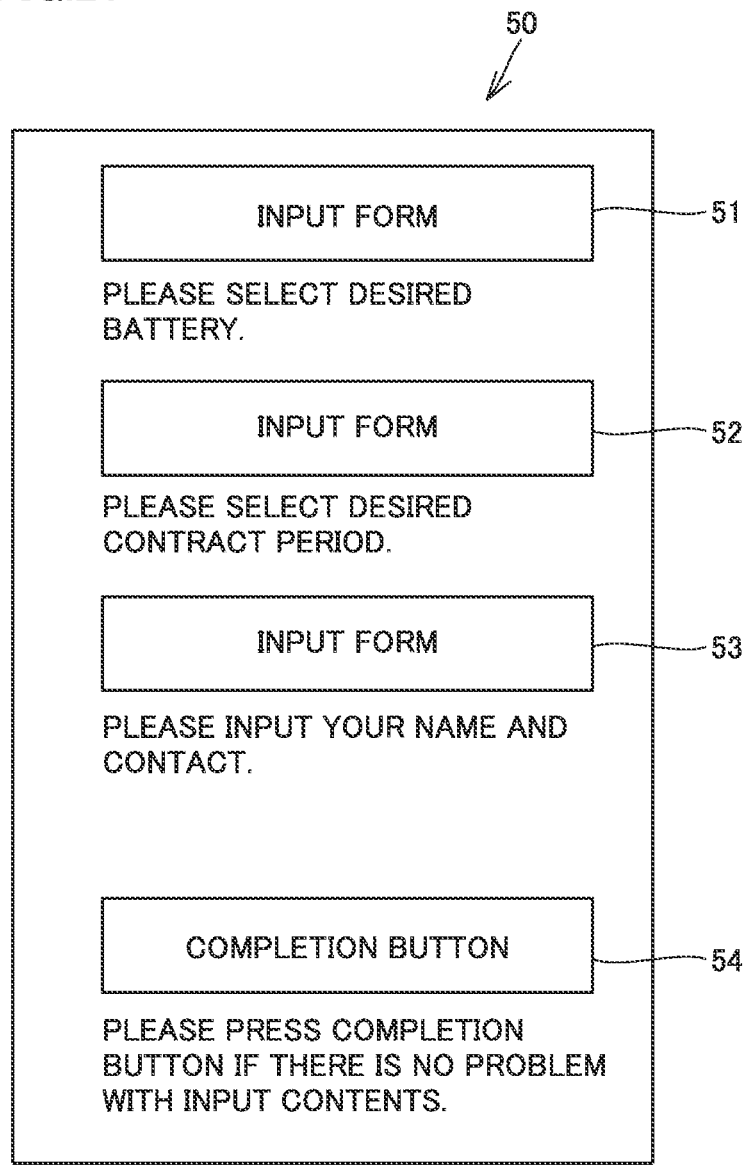
FIG. 21 is a diagram showing an input screen 50.

Specifically, user 4 inputs various types of information into input screen 50 displayed on display unit 33 of terminal 11. FIG. 21 is a diagram showing input screen 50. Input screen 50 includes an input form 51, an input form 52, an input form 53, and a completion button 54.

User 4 inputs battery 83 desired to be used into input form 51. User 4 inputs a desired contract period into input form 52, and inputs information specifying user 4 into input form 53. When the various types of inputs are completed, user 4 presses completion button 54. When completion button 54 is pressed, terminal 11 transmits user selection information USIB to server 10B. User selection information USIB includes: information specifying the battery selected by user 4; information specifying user 4; information specifying the contract period desired by user 4; and information specifying terminal 11.

Figure 22:
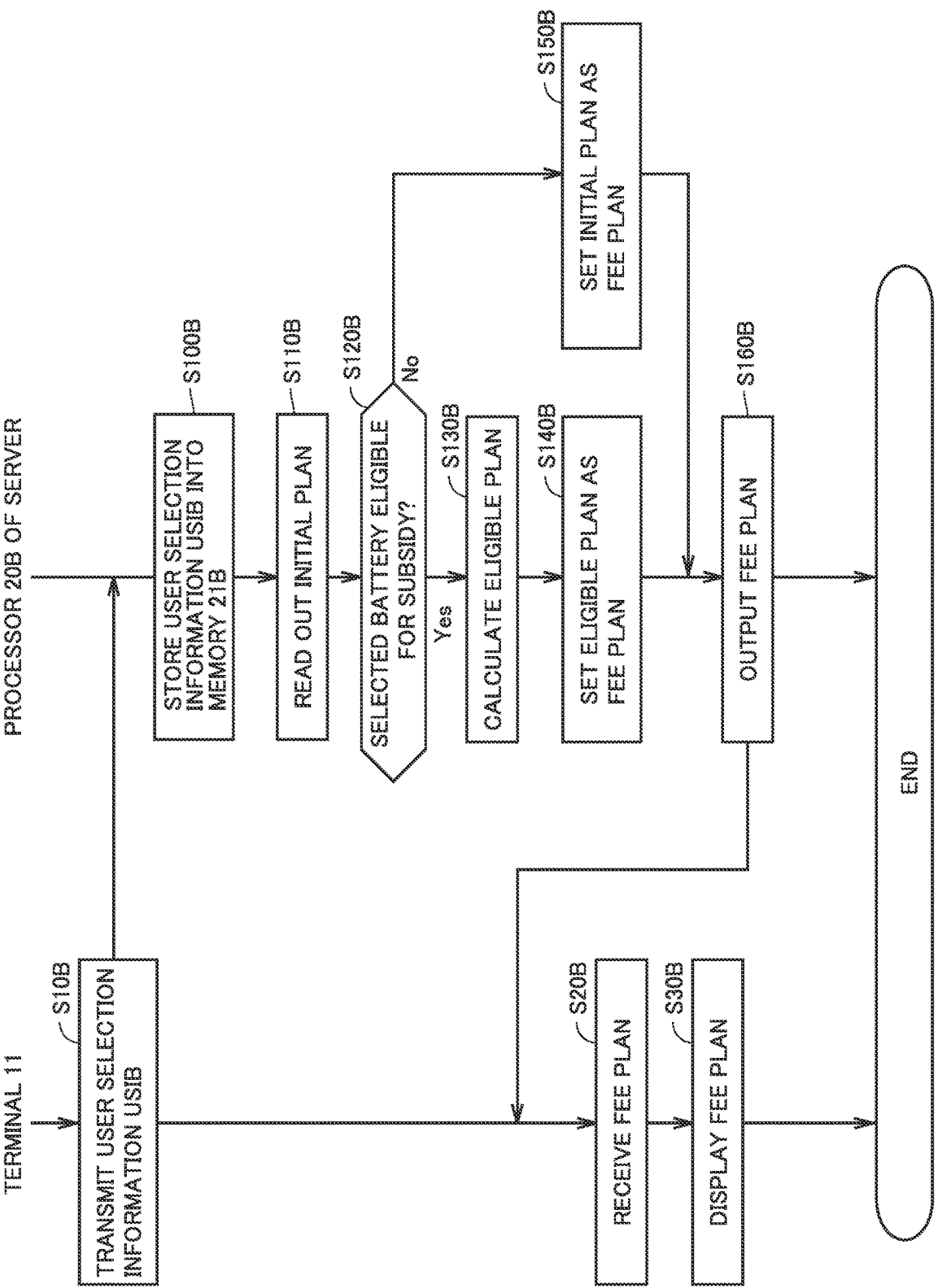
FIG. 22 is a diagram showing a flow until a fee plan is output from a server 10B to terminal 11 after user selection information USIB is transmitted.

FIG. 22 is a diagram showing a flow until the fee plan is output from server 10B to terminal 11 after user selection information USIB is transmitted.

Terminal 11 transmits user selection information USIB to server 10B (S10B). Processor 208 of server 10B stores user selection information USIB into memory 21B (S100B). Processor 20B reads out initial plan PID for the battery selected by user 4 (S110B). Processor 20B determines whether or not the battery selected by user 4 is eligible for a subsidy (S120).

When processor 20B determines that the battery selected by user 4 is eligible for a subsidy (Yes in S120B), processor 20B calculates eligible plan PI4 (S130). Then, processor 20B sets eligible plan PI4 as the fee plan (S160B).

On the other hand, when processor 20B determines that the battery selected by user 4 is not eligible for subsidies S1, S2 (No in S120B), processor 20B sets initial plan PID as the fee plan (S150B).

Then, processor 208 outputs the set fee plan to terminal 11 (S160B). Terminal 11 receives the fee plan from processor 201 (S20B), and terminal 11 displays the received fee plan on display unit 33 (S30B). It should be noted that in the third embodiment, each of subsidy S3 and subsidy S4 is a subsidy for batteries. On the other hand, for example, when BEV 3A is eligible for at least one of subsidy S3 and subsidy S4, eligible plan PI4 may be calculated by subtracting part of subsidies S3, S4 to be granted from initial plan PID. It should be noted that in the first to third embodiments, the processors calculate eligible plans P11 to P14 and output the calculated eligible plans to terminal 11. On the other hand, for example, vehicles 3 may respectively store eligible plans P11 to P14 for the case where vehicles 3 are eligible for a subsidy, and corresponding eligible plans P11 to P14 may be output based on user selection information USI.

Although embodiments of the present disclosure has been described and illustrated in detail, it is clearly understood that the same is by way of illustration and example only and is not to be taken by way of limitation, the scope of the present disclosure being interpreted by the terms of the appended claims. The scope of the present disclosure is defined by the terms of the claims, and is intended to include any modifications within the scope and meaning equivalent to the terms of the claims.

What is claimed is:

1. An information processing device that outputs a fee plan indicating a fee required to use a vehicle including a battery selected by a user, the information processing device comprising:
   a communication unit that communicates over a network with an external terminal operated by the user and an external server; and
   a processor configured to:
      receive, from the external terminal via the communication unit, selection information specifying a selected object selected by the user on the external terminal;

acquire a residual value of the battery mounted on the vehicle specified in the selection information, wherein the residual value of the battery is calculated based on a capacity retention of the battery and includes a residual value of the battery at a start time of a use period and a plurality of residual values of the battery at a plurality of times after the start time and before an end time of the use period, the residual value of the battery being updated regularly;

set an initial fee plan based on the residual value of the battery such that a rate of change of the fee with passage of time during the use period follows a rate of change of the residual value of the battery with passage of time during the use period;

upon determining that the selected object is not eligible for a subsidy, cause the external terminal to display the initial fee plan; and upon determining that the selected object is eligible for the subsidy, cause the external terminal to display an eligible plan which is a fee plan modified from the initial fee plan, wherein in the eligible plan, the fee is set to a fixed amount of money in an initial predetermined period out of the use period, and after the initial predetermined period, the fee is set to be lower than the fixed amount of money and to be decreased with passage of time until the end time of the use period.

2. The information processing device according to claim 1, further comprising a memory, wherein the memory stores the initial fee plan that does not take the subsidy into consideration with regard to the selected object, and when the selected object is an electrically powered vehicle and is an eligible vehicle that is eligible for the subsidy, the processor outputs the eligible plan by reducing a fee corresponding to the subsidy from the fee of the initial fee plan in the initial predetermined period so as to allow the fee to be the fixed amount of money in the initial predetermined period.

3. The information processing device according to claim 2, wherein in the initial fee plan, the fee in the initial predetermined period is set to be decreased with passage of time.

4. The information processing device according to claim 3, wherein when the selected vehicle is an electrically powered vehicle, the processor calculates the initial fee plan based on the residual value of the battery mounted on the electrically powered vehicle.

5. The information processing device according to claim 2, wherein in the initial fee plan, the fee in the initial predetermined period is fixed.

6. The information processing device according to claim 1, wherein the processor is further configured to:

acquire information about a disposal restriction period of the subsidy granted for the selected object, and set the initial predetermined period to be equal to or shorter than the disposal restriction period in the eligible plan.

7. The information processing device according to claim 1, wherein the subsidy includes a first subsidy granted from a national government and a second subsidy granted from a local government, and when the selected object is an electrically powered vehicle, the processor outputs the eligible plan based on information about the first subsidy and the second subsidy to be granted.

8. The information processing device according to claim 7, wherein the selection information includes primary location information indicating a primary location for use of the electrically powered vehicle, and address information indicating an address of the user, when the selected object is the electrically powered vehicle, the processor determines whether or not the second subsidy is to be granted based on the primary location information, the address information, and information about the second subsidy, and when the processor determines that the second subsidy is to be granted, the processor outputs the eligible plan.

9. The information processing device according to claim 1, wherein the processor is further configured to regularly update the initial fee plan based on the regularly updated residual value of the battery mounted on the vehicle.

10. A method of creating a fee plan, the method comprising:

acquiring, from an external terminal over a network, selection information about a vehicle including a battery selected by a user on the external terminal;

acquire a residual value of the battery mounted on the vehicle specified in the selection information, wherein the residual value of the battery is calculated based on a capacity retention of the battery and includes a residual value of the battery at a start time of a use period and a plurality of residual values of the battery at a plurality of times after the start time and before an end time of the use period, the residual value of the battery being updated regularly;

setting an initial fee plan based on the residual value of the battery such that a rate of change of the fee with passage of time during the use period follows a rate of change of the residual value of the battery with passage of time during the use period;

upon determining that the selected vehicle is not eligible for a subsidy, causing the external terminal to display the initial fee plan; and upon determining that the selected vehicle is eligible for the subsidy, causing the external terminal to display an eligible plan which is a fee plan modified from the initial fee plan, wherein in the eligible plan, the fee is set to an fixed amount of money in an initial predetermined period out of the use period, and after the initial predetermined period, the fee is set to be lower than the fixed amount of money and to be decreased with passage of time until the end time of the use period.

* * * * *